(12) United States Patent
Kim

(10) Patent No.: US 11,203,258 B2
(45) Date of Patent: Dec. 21, 2021

(54) HIGH VOLTAGE BATTERY UNIT FOR VEHICLE AND UNDERBODY OF VEHICLE

(71) Applicants: Hyundai Motor Company, Seoul (KR); Kia Motors Corporation, Seoul (KR)

(72) Inventor: Un-Tae Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 118 days.

(21) Appl. No.: 16/829,235

(22) Filed: Mar. 25, 2020

(65) Prior Publication Data

US 2021/0179193 A1    Jun. 17, 2021

(30) Foreign Application Priority Data

Dec. 16, 2019 (KR) .................. 10-2019-0167786

(51) Int. Cl.
| | |
|---|---|
| B60J 7/00 | (2006.01) |
| B60K 1/04 | (2019.01) |
| H01M 50/20 | (2021.01) |
| B62D 25/20 | (2006.01) |
| B60K 17/24 | (2006.01) |
| B60L 50/60 | (2019.01) |
| B60K 6/28 | (2007.10) |

(52) U.S. Cl.
CPC ............... B60K 1/04 (2013.01); B60K 17/24 (2013.01); B62D 25/2018 (2013.01); B62D 25/2027 (2013.01); B62D 25/2036 (2013.01); H01M 50/20 (2021.01); B60K 6/28 (2013.01); *B60K 2001/0438* (2013.01); *B60L 50/66* (2019.02); *B60Y 2200/91* (2013.01); *B60Y 2200/92* (2013.01); *H01M 2220/20* (2013.01)

(58) Field of Classification Search
CPC ........ B60R 21/232; B60R 2021/23386; B60R 2021/23316; B60R 21/2338; B60R 21/213; A47C 7/46; C08F 210/00; C08F 210/06; C12N 15/8247; A23V 2002/00
See application file for complete search history.

(56) References Cited

U.S. PATENT DOCUMENTS

| | | | | |
|---|---|---|---|---|
| 2,193,229 A | * | 3/1940 | Exner | B60R 19/48 293/113 |
| 4,566,407 A | * | 1/1986 | Peter | B60K 11/08 123/41.48 |
| 4,653,788 A | * | 3/1987 | Di Giusto | B60K 11/08 188/264 A |
| 4,706,615 A | * | 11/1987 | Scadding | F01P 11/10 123/198 E |
| 4,917,434 A | * | 4/1990 | Sumitani | B62D 37/02 105/1.2 |
| 4,938,303 A | * | 7/1990 | Schaal | B60H 1/3227 180/68.1 |

(Continued)

*Primary Examiner* — Kiran B Patel
(74) *Attorney, Agent, or Firm* — Mintz Levin Cohn Ferris Glovsky and Popeo, P.C.; Peter F. Corless

(57) ABSTRACT

An active air curtain apparatus is provided. The apparatus includes a duct that is formed with a suction port, a discharge port, and an air flow path from the section port to the discharge port and that is mounted to the inner surface of a bumper of the vehicle. A flap having a plate shape is operated by being supported and guided by the duct and is configured to open and close the discharge port.

18 Claims, 12 Drawing Sheets

(56) References Cited

U.S. PATENT DOCUMENTS

| | | | | |
|---|---|---|---|---|
| 4,995,447 | A * | 2/1991 | Weidmann | B60K 11/08 123/41.33 |
| 5,141,068 | A * | 8/1992 | Mendicino | B60K 13/06 180/68.3 |
| 5,322,340 | A * | 6/1994 | Sato | B62D 25/20 180/68.1 |
| 5,860,685 | A * | 1/1999 | Horney | B60K 13/02 293/113 |
| 6,405,819 | B1 * | 6/2002 | Ohkura | B60K 11/08 180/68.1 |
| 10,647,194 | B1 * | 5/2020 | Burtch | B60K 11/085 |
| 11,027,785 | B1 * | 6/2021 | Golan | B62D 25/12 |
| 11,084,544 | B2 * | 8/2021 | Nishida | B60R 13/0861 |
| 2004/0144522 | A1 * | 7/2004 | Bauer | B60R 19/12 165/67 |
| 2005/0115943 | A1 * | 6/2005 | Winter | G01S 7/032 219/202 |
| 2007/0023238 | A1 * | 2/2007 | Ramsay | B60T 5/00 188/71.6 |
| 2007/0091632 | A1 * | 4/2007 | Glovatsky | F21V 29/70 362/547 |
| 2012/0024611 | A1 * | 2/2012 | Ajisaka | B60K 11/08 180/68.1 |
| 2012/0145272 | A1 * | 6/2012 | Chu | B60K 11/08 138/111 |
| 2012/0199316 | A1 * | 8/2012 | Maurer | F01P 11/08 165/44 |
| 2015/0202955 | A1 * | 7/2015 | Powell | B60R 13/06 180/68.3 |
| 2015/0345578 | A1 * | 12/2015 | Nightingale | B62D 35/008 188/264 AA |
| 2016/0016617 | A1 * | 1/2016 | Wolf | B60K 11/085 296/208 |
| 2016/0039479 | A1 * | 2/2016 | Kishima | B62D 35/00 296/181.5 |
| 2016/0075383 | A1 * | 3/2016 | Haas | B62D 25/02 296/180.1 |
| 2016/0176385 | A1 * | 6/2016 | Wolf | F16D 65/847 296/208 |
| 2016/0176450 | A1 * | 6/2016 | Wolf | B60K 11/04 180/68.2 |
| 2016/0280162 | A1 * | 9/2016 | Yamada | B62D 35/00 |
| 2017/0082092 | A1 * | 3/2017 | Gaither | B60L 3/0076 |
| 2017/0136872 | A1 * | 5/2017 | Ribaldone | B60K 11/08 |
| 2017/0225623 | A1 * | 8/2017 | Gaylard | B62D 35/02 |
| 2017/0349040 | A1 * | 12/2017 | Nagaosa | B60L 50/75 |
| 2017/0355333 | A1 * | 12/2017 | Kishima | B62D 35/005 |
| 2018/0051859 | A1 * | 2/2018 | Scervo | B60K 11/08 |
| 2018/0340735 | A1 * | 11/2018 | Takaishi | F28F 9/0131 |
| 2018/0347909 | A1 * | 12/2018 | Shimota | F16H 57/0417 |
| 2019/0152540 | A1 * | 5/2019 | Tsuchino | B60R 19/48 |
| 2020/0010039 | A1 * | 1/2020 | Hosaka | F01P 11/10 |
| 2020/0063639 | A1 * | 2/2020 | Nakamura | F01P 11/10 |
| 2020/0086734 | A1 * | 3/2020 | Sedlak | B60K 11/085 |
| 2020/0114681 | A1 * | 4/2020 | Parry-Williams | B60B 7/066 |
| 2020/0398643 | A1 * | 12/2020 | Miyazaki | B60K 11/02 |
| 2021/0001927 | A1 * | 1/2021 | Diehl | B62D 35/005 |
| 2021/0237673 | A1 * | 8/2021 | Tokuyama | B60R 19/52 |

* cited by examiner

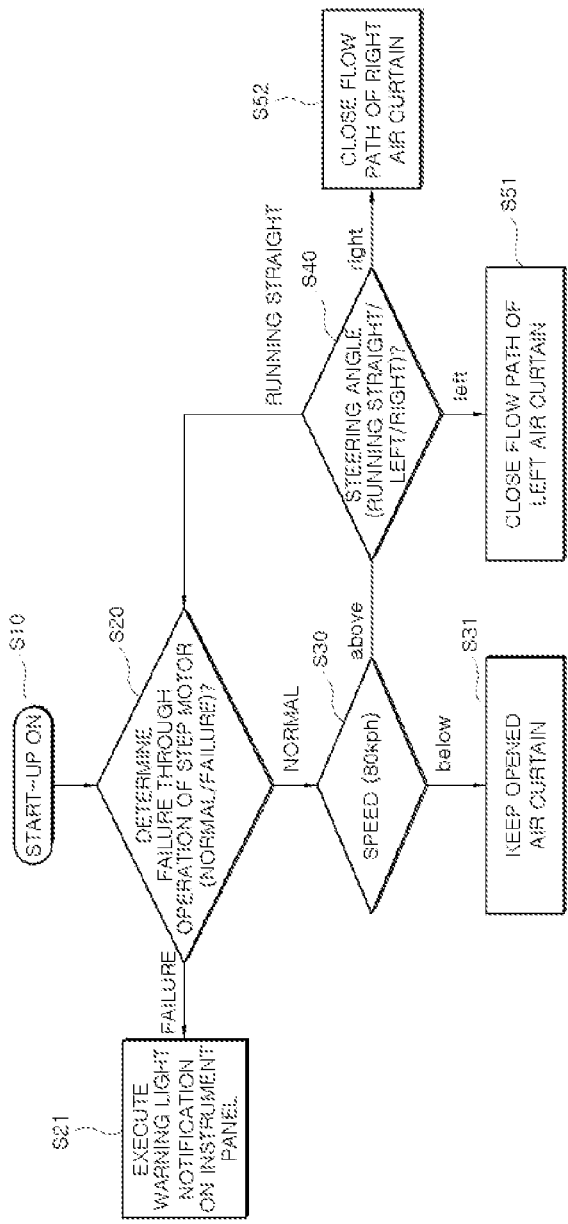

HIGH VOLTAGE BATTERY UNIT FOR VEHICLE AND UNDERBODY OF VEHICLE

CROSS-REFERENCE TO RELATED APPLICATION

This application claims priority to Korean Patent Application No. 10-2019-0167786, filed on Dec. 16, 2019, which is incorporated herein by reference in its entirety.

BACKGROUND

Field of the Disclosure

The present disclosure relates to an air curtain apparatus, and more particularly, to an air curtain apparatus applied to a vehicle bumper and a method of controlling the same.

Description of Related Art

Due to the recent increase in emission regulation enforcement, research regarding improvements to fuel efficiency of a vehicle is being actively conducted. Various aerodynamics improvement techniques have been applied to improve fuel efficiency, and the air curtain mounted to a front bumper of the vehicle is one of the aerodynamics improvement techniques for improving the flow around a wheel house. Generally, the air curtain has an air suction port at the left and right sides of the front bumper and a discharge port formed on the rear surface of the wheel house.

Referring to FIG. 1 of the prior art, when a vehicle is being driven straight as shown in the upper-side case thereof, air exiting the air curtain flows while riding the tire to minimize vortex generated in the vicinity of the wheel. As described above, when the vehicle is being driven straight, it is possible to achieve the aerodynamics improvement effect. However, as shown in the lower-side case of FIG. 1, when the vehicle turns, the flow hits the tire if the tire protrudes further outward, thereby generating a greater vortex and worsening the air resistance.

The contents described in this section are merely to help the understanding of the background of the present disclosure, and may include what is not previously known to those skilled in the art to which the present disclosure pertains.

SUMMARY

The present disclosure provides an active air curtain apparatus, an active air curtain system, and a control method thereof, which may actively adjust the flow path of an air curtain based on a steering angle during the operation of a vehicle.

An active air curtain apparatus according to one aspect of the present disclosure may include: a duct formed with a suction port, a discharge port, and an air flow path from the suction port to the discharge port and mounted to the inner surface of a bumper of a vehicle; and a flap having a plate shape operated by being supported and guided by the duct and configured to open and close the discharge port. In addition, the flap may be formed with a gear part, and the active air curtain apparatus may further include a drive gear engaged with the gear part to be driven and a step motor configured to operate the drive gear.

Furthermore, the gear part may include a first protrusion end formed to extend in a direction perpendicular to the longitudinal direction of the flap and a second protrusion end spaced apart from the first protrusion end and formed to extend in a direction perpendicular to the longitudinal direction of the flap. The first protrusion end and the second protrusion end may be formed with a first inner gear and a second inner gear, respectively. In addition, the drive gear may include a first gear engaged with the first inner gear and a second gear engaged with the second inner gear and the first gear.

Meanwhile, the duct may further include a flap guide part formed at the discharge port side and configured to support and guide the flap. In addition, the flap guide part may include a flap guide end having a shape that protrudes in a direction inclined to the direction of the air flow path and that extends in a direction parallel to the longitudinal direction of the discharge port and a flap guide aperture formed along the longitudinal direction of the flap guide end. In addition, the flap opens or closes the discharge port based on the rotation direction of the step motor.

According to another aspect, the present disclosure provides an active air curtain system in which the pair of active air curtain apparatuses are provided, and the pair of active air curtain apparatuses may be mounted at the left side of the bumper and the right side of the bumper with respect to the front of the vehicle, respectively. In addition, when the vehicle turns to the left, the discharge port of the active air curtain apparatus mounted to the left side of the bumper may be closed, and when the vehicle turns to the right, the discharge port of the active air curtain apparatus mounted to the right side of the bumper may be closed.

A method of controlling a pair of active air curtain apparatuses according to one aspect of the present disclosure, which each include: a duct formed with a suction port, a discharge port, and an air flow path from the suction port to the discharge port and mounted to the inner surface of a bumper of a vehicle; and a flap having a plate shape operated by being supported and guided by the duct and configured to open and close the discharge port, and mounted to the left side of the bumper and the right side of the bumper with respect to the front of the vehicle, respectively, may include determining whether the vehicle turns, and an operation of the pair of active air curtain apparatuses may be adjusted based on whether the vehicle turns.

In addition, when the vehicle turns to the left, the flap of the active air curtain apparatus mounted to the left side of the bumper may be adjusted to operate in a direction in which the discharge port is closed. In particular, when a steering angle of the vehicle is less than about −3° with respect to 0°, the vehicle may be determined to be turning to the left. Alternatively, when the vehicle turns to the right, the flap of the active air curtain apparatus mounted to the right side of the bumper may be adjusted to operate in a direction in which the discharge port is closed. In particular, when a steering angle of the vehicle is greater than about +3° with respect to 0°, the vehicle may be determined to be turning to the right.

In addition, the method may further include comparing a vehicle speed with a reference vehicle speed, before determining whether the vehicle turns. Furthermore, when the vehicle speed is greater than the reference vehicle speed, whether the vehicle turns may be determined, and when the vehicle speed is less than the reference vehicle speed, the flap of the pair of active air curtain apparatuses may be maintained in a state of opening the discharge port.

There has been a problem in that a general air curtain provides the aerodynamics improvement effect when a vehicle is being driven straight, but degrades the aerodynamics if the tire protrudes outward when the vehicle turns. However, in the active air curtain apparatus and the control method thereof according to the present disclosure, it may be possible to actively perform the open/close control of the air curtain flow path when the vehicle turns, thereby improving the aerodynamics.

In addition, the flow patterns at the left and right sides of the front bumper may be changed when the left and right air curtain flow paths are controlled differently. If the left flow path is opened and only the right flow path is closed, the high pressure region increases at the right side of the front bumper, causing the moment to rotate to the right. Therefore, by blocking the right flow path when the vehicle turns to the right, it may be possible to improve the aerodynamics and also to improve the handling performance.

BRIEF DESCRIPTION OF THE DRAWINGS

The objects, features and advantages of the present disclosure will be more apparent from the following detailed description in conjunction with the accompanying drawings, in which:

FIG. 9 is a diagram showing a control method of the active air curtain apparatus according to an exemplary embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to fully understand the present disclosure, the operational advantages of the present disclosure, and the objects achieved by carrying out the present disclosure, reference should be made to the accompanying drawings which exemplify embodiments of the present disclosure and the contents described in the accompanying drawings. In describing the exemplary embodiments of the present disclosure, publicly-known techniques or repeated descriptions which may unnecessarily obscure the subject matter of the present disclosure will be briefly explained or omitted.

Figure 1:
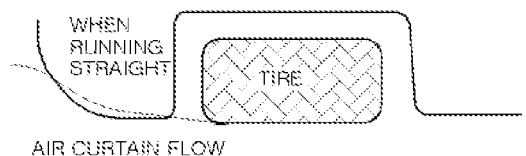
FIG. 1 is a diagram showing a change in air flow by a general air curtain according to the prior art.
Figure 1:
Figure 2:
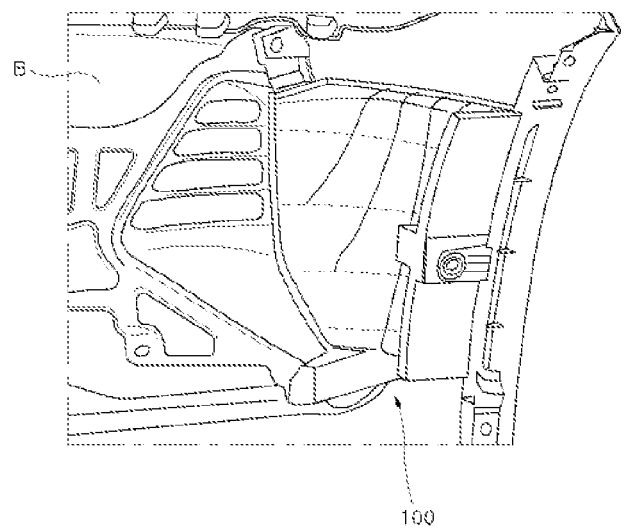
FIG. 2 is a diagram showing a state where an active air curtain apparatus has been mounted according to an exemplary embodiment of the present disclosure.
Figure 3:
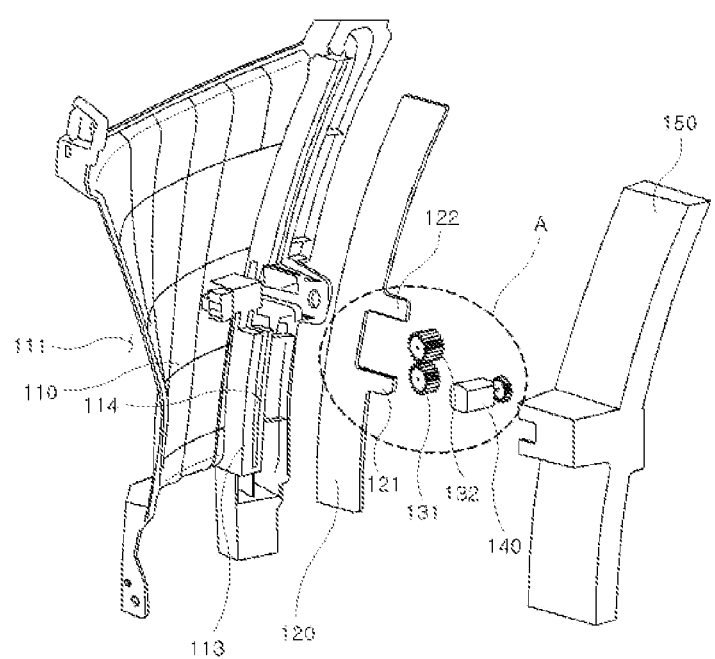
FIG. 3 is an exploded perspective diagram of the active air curtain apparatus according to an exemplary embodiment of the present disclosure.
Figure 4:
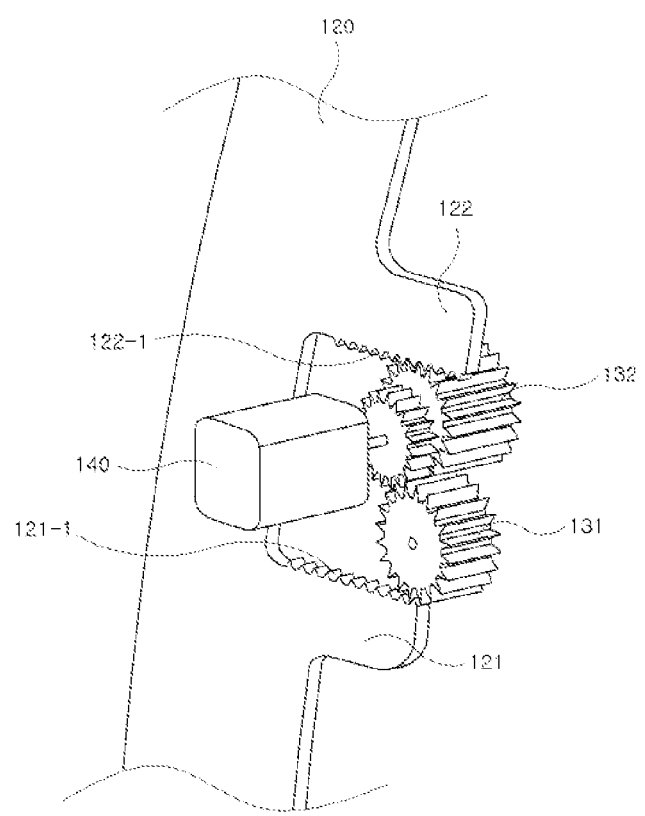
FIG. 4 is an enlarged diagram of a portion A of FIG. 3 according to an exemplary embodiment of the present disclosure.

FIG. 2 is a diagram showing a state where an active air curtain apparatus according to the present disclosure has been mounted, FIG. 3 is an exploded perspective diagram of the active air curtain apparatus according to the present disclosure, and FIG. 4 is an enlarged diagram of a portion A of FIG. 3.

Hereinafter, an active air curtain apparatus and an active air curtain system according to an exemplary embodiment of the present disclosure will be described with reference to FIGS. 2, 3, and 4. As shown in FIG. 2, an active air curtain apparatus 100 according to an exemplary embodiment of the present disclosure may be mounted on either side portion of a front bumper (B) of a vehicle to discharge the air, suctioned from the front of the vehicle, to the outside of both front left and right side tires with respect to the vehicle, thereby improving the aerodynamics. Particularly, the active air curtain apparatus 100 according to an exemplary embodiment of the present disclosure is an apparatus capable of improving the aerodynamics without serving as a resistor not only when the vehicle is being driven straight but also when the vehicle turns.

Accordingly, the active air curtain apparatus 100 may include a duct 110, a flap 120, drive gears 131, 132, a step motor 140, and a protective cover 150. The ducts 110 may be mounted on the inner surfaces of both side portions of the front bumper (B), the air flow path may be formed between the inner surface and the duct 110, and the duct 110 may include a suction port 111 formed at a first side thereof, and a discharge port 112 formed at a second side thereof.

In addition, a flap guide part for accommodating and guiding the flap 120 to be described later may be formed at the second side where the discharge port 112 has been formed. The flap guide part may include a flap guide end 113 having a shape that protrudes in a direction inclined to the flow path direction of the duct 110 and extends substantially vertically with respect to the vehicle, and a flap guide aperture 114 formed along the longitudinal direction of the flap guide end 113 and the flap 120 may be inserted therein, and guides an operation of the flap 120 as the flap 120 is inserted into and supported by the flap guide part. The flap 120 may be formed in a plate shape having the width and the length corresponding to the flap guide aperture 114, may be inserted into the flap guide aperture 114, and may include a gear part at the middle end of the plate.

As shown, the gear part may be formed of a first protrusion end 121 and a second protrusion end 122 extending in a direction perpendicular to the longitudinal direction of the flap 120, and the first protrusion end 121 and the second protrusion end 122 may be formed to be spaced apart from each other such that a groove 123 into which a drive gear to be described later may be inserted is formed between the first protrusion end 121 and the second protrusion end 122. Accordingly, a first inner gear 121-1 may be formed on the groove-side surface of the first protrusion end 121, and a second inner gear 122-1 may be formed on the groove-side surface of the second protrusion end 122.

The drive gear may be engaged with the gear formed on the groove-side surface of the flap 120 to be rotated by the step motor 140 for operating the drive gear, thereby operating the flap 120 in the width direction. The drive gear is configured as one and connected to the step motor 140 to operate simultaneously with the operation of the step motor 140, and may be configured to be engaged with the inner gears 121-1, 122-1 of the flap 120 to operate the flap 120. In the example of the present disclosure, the drive gear may be provided as a pair of a first gear 131 and a second gear 132 for a more stable operation design.

Accordingly, as shown in FIG. 4, the first gear 131 may be engaged with the first inner gear 121-1, the second gear 132 may be engaged with the first gear 131 and the second inner gear 122-1, and the step motor 140 may be engaged with the first gear 131, and thus, the step motor 140 may be configured to rotate the first gear 131, and the second gear 132 rotates based on the rotation of the first gear 131. The step motor 140 may be configured to rotate at a regular angle in proportion to an input signal, and the first gear 131 and the second gear 132 may be rotated in a direction opposite to each other by a corresponding amount by adjusting the rotation amount of the step motor 140, and the flap 120 may be operated forward or backward in the drawing in the width direction by adjusting the rotation direction of the step motor 140.

The flap guide end 113 may be open in both width directions, and when the flap 120 is operated as described above and is operated forward in the drawing, the flap guide end 113 protrudes downward, that is, toward the discharge port 112 side to close the discharge port 112. As described above, the air curtain capable of actively operating the flap 120 according to the present disclosure may block the discharge port of the air curtain in the turning direction when the vehicle turns, thereby preventing the air from serving as the resistor with respect to the tire of the turning direction.

In addition, the protective cover 150 having a shape which covers the flap 120, the drive gear, and the step motor 140 may be configured, and the protective cover 150 may be coupled to the duct 110 or the flap guide end 113. Accordingly, the step motor 140 may be supported by the flap guide end 113, or another structure formed on the protective cover 150 or the duct 110.

Figure 5A:
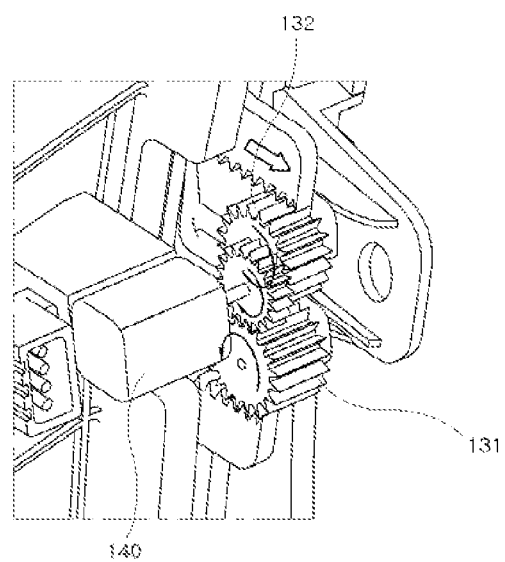
FIGS. 5A, 5B, and 5C are diagrams showing operating states in the flow path opening control of the active air curtain according to an exemplary embodiment of the present disclosure.
Figure 5B:
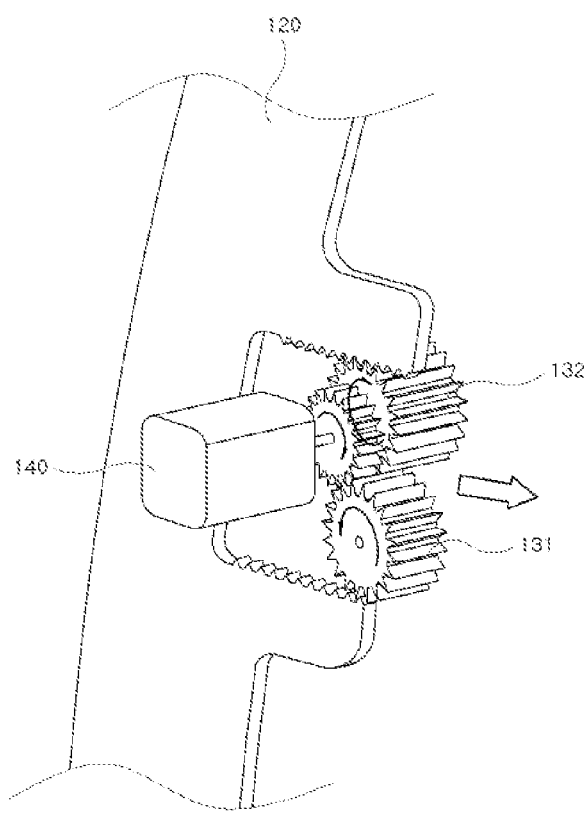
Figure 5C:
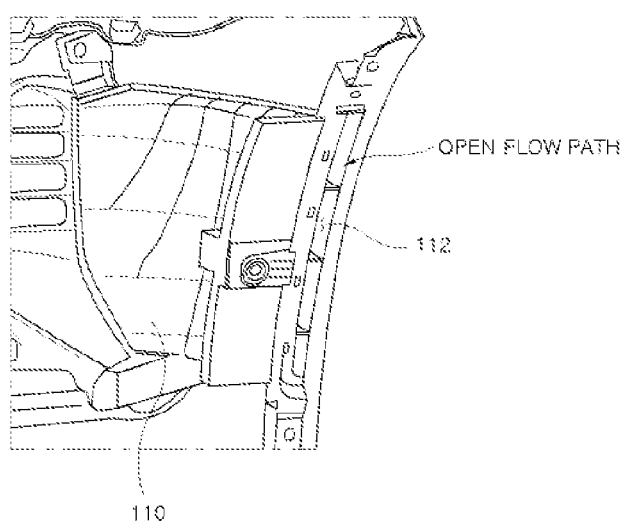

Further, an operating state of the active air curtain apparatus according to the present disclosure will be described with reference to FIGS. 5A to 6C. FIGS. 5A, 5B and 5C are operating states when the flow path is opened, and FIGS. 6A, 6B and 6C are operating states when the flow path is closed.

As shown in FIG. 5A, when the step motor 140 rotates clockwise, the first gear 131 rotates counterclockwise, and the second gear 132 rotates clockwise. Therefore, as in FIG. 5B, the flap 120 is moved in the thick arrow direction (right side in the drawing), to locate the flap 120 inside the flap guide end 113 and as in FIG. 5C, the discharge port 112 of the duct 110 becomes an open state to discharge air to the tire side.

Figure 6A:
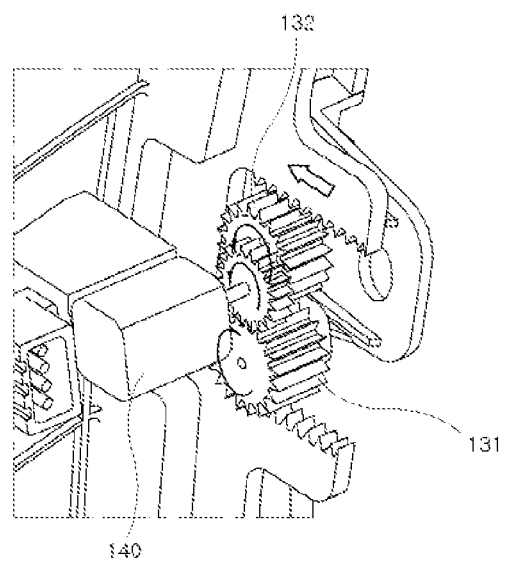
FIGS. 6A, 6B, and 6C are diagrams showing operating states in the flow path closing control of the active air curtain according to an exemplary embodiment of the present disclosure.
Figure 6B:
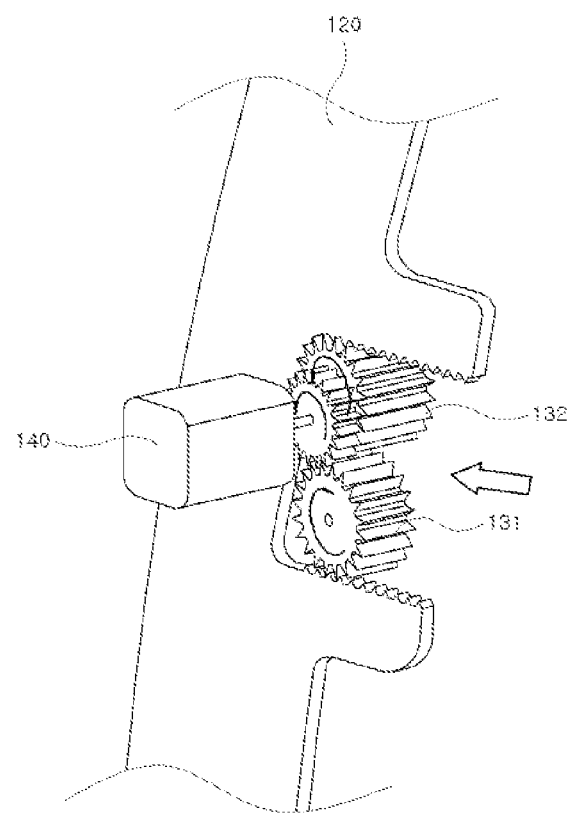
Figure 6C:
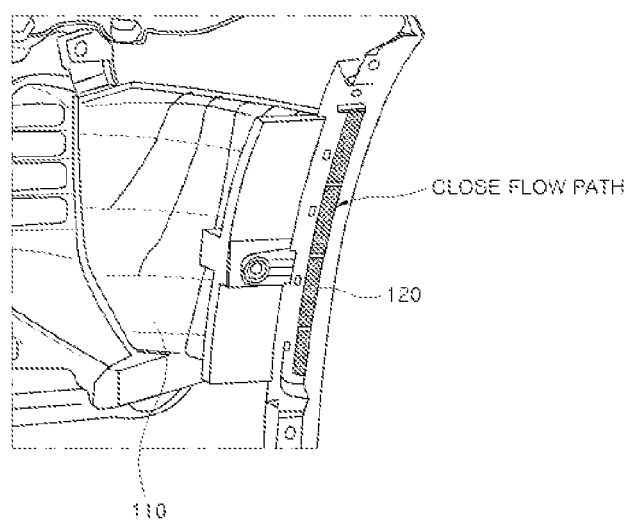

Meanwhile, as shown in FIG. 6A, when the step motor 140 rotates counterclockwise, the first gear 131 rotates clockwise, and the second gear 132 rotates counterclockwise. Accordingly, as in FIG. 6B, the flap 120 is moved in the thick arrow direction (left side in the drawing), to move the flap 120 away from the flap guide end 113, and as in FIG. 6C, the discharge port 112 of the duct 110 becomes a closed state. In other words, the flap 120 moves to the discharge port 112 side to close the discharge port 112, thereby preventing the air from being discharged to the tire side.

Figure 7:
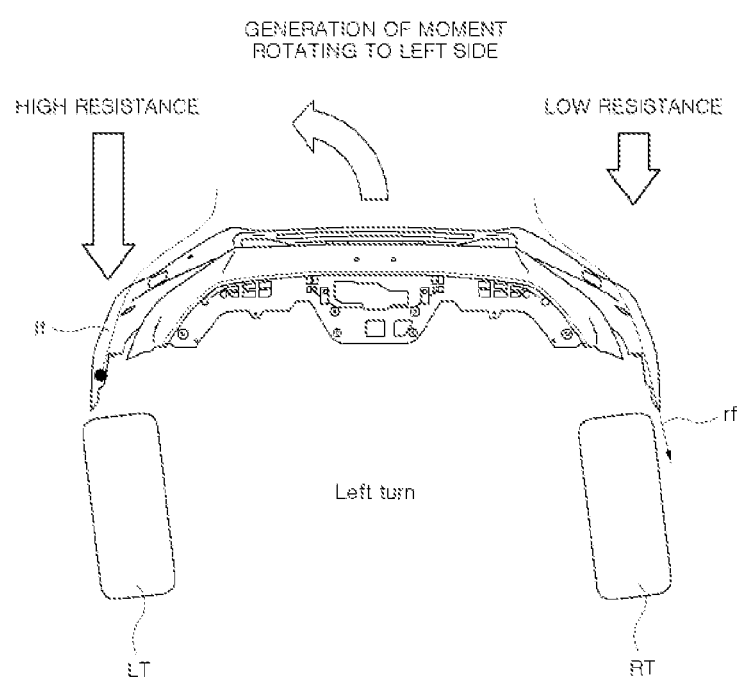
FIGS. 7 and 8 are diagrams showing the application of the active air curtain apparatus according to an exemplary embodiment of the present disclosure and the flow state when the vehicle turns.
Figure 8:
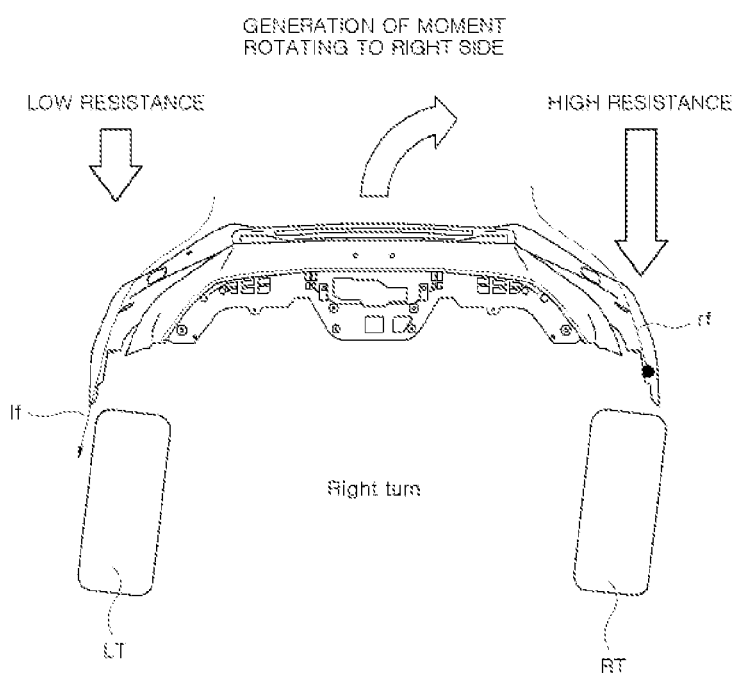

Accordingly, the flow states as in FIGS. 7 and 8 may be formed according to the rotation direction control of the step motor 140. In other words, when the vehicle turns to the left side as in FIG. 7, the air curtain apparatus at the left side of the bumper closes the discharge port blocking any left flow (10, thereby preventing the air from being discharged to a left tire (LT) having a high resistance. The air curtain apparatus at the right side of the bumper opens the discharge port to allow the air to be discharged to a right tire (RT) having a low resistance by a right flow (rf), thereby improving the aerodynamics.

On the contrary, when the vehicle turns to the right side as in FIG. 8, the air curtain apparatus at the right side of the bumper closes the discharge port blocking any right flow (rf), thereby preventing the air from being discharged to the right tire (RT) having a high resistance. The air curtain apparatus at the left side of the bumper opens the discharge port to allow the air to be discharged to the left tire (LT) having a low resistance by the left flow (10, thereby improving the aerodynamics.

Moreover, a control method of the active air curtain apparatus and the active air curtain system according to the present disclosure described above will be described with reference to FIG. 9. The control method described herein below may be executed by a controller. In the start-up state (S10), whether the stepper motor is in a normal operation (e.g., without malfunction or failure) may be determined (S20), and in the case of a failure, a warning light notification may be executed (S21).

When the step motor is normal, a vehicle speed may be determined by comparing with a reference vehicle speed (S30). As shown, the reference vehicle speed may be about 80 kph, but may vary according to specifications of the vehicle, specifications of the air curtain apparatus, performance, and the like. Accordingly, when the vehicle speed is less than the reference vehicle speed, the air curtain apparatus may be maintained open (S31). In other words, the flap 120 may be operated to open the discharge port 112.

However, when the vehicle speed is greater than the reference vehicle speed, where the vehicle turns may be determined based on a steering angle (S40). As a result, when the vehicle is being driven straight, the initial S20 may be repeated. When the vehicle turns to the left side, the flow path of the left air curtain apparatus, that is, the discharge port, may be closed (S51), and when the vehicle turns to the right side, the flow path of the right air curtain apparatus, that is, the discharge port, may be closed (S52).

Particularly, whether the vehicle turns left, turns right, or is driven straight may be determined by the controller based on the steering angle. For example, the determination criterion of the left turn may be set to a case where the steering angle is less than about −3° with respect to 0°, the determination criterion of the right turn may be set to a case where the steering angle is greater than about +3° with respect to 0°, and the determination criterion of being driven straight may be set within the range of about −3° to +3°.

As described above, the present disclosure may reduce the air resistance and improve the aerodynamics force by actively controlling the flow path of the air curtain according to the steering angle during the running.

As described above, although the present disclosure has been described with reference to the exemplary drawings, it is not limited to the described exemplary embodiments, and it is apparent to those skilled in the art that the present disclosure may be modified and changed variously without departing from the spirit and scope of the present disclosure. Accordingly, such modifications or changes should be included in the claims of the present disclosure, and the scope of the present disclosure should be construed based on the appended claims.

What is claimed is:

1. An active air curtain apparatus of a vehicle, comprising:
    a duct formed with a suction port, a discharge port, and an air flow path from the suction port to the discharge port and mounted to the inner surface of a bumper of the vehicle; and
    a flap having a plate shape operated by being supported and guided by the duct and configured to open and close the discharge port.

2. The active air curtain apparatus of claim 1, wherein the flap is formed with a gear part, and further includes:
    a drive gear engaged with the gear part to be driven; and
    a step motor configured to operate the drive gear.

3. The active air curtain apparatus of claim 2, wherein the gear part includes:
    a first protrusion end formed to extend in a direction perpendicular to the longitudinal direction of the flap; and
    a second protrusion end spaced apart from the first protrusion end and formed to extend in a direction perpendicular to the longitudinal direction of the flap,
    wherein the first protrusion end and the second protrusion end are formed with a first inner gear and a second inner gear, respectively.

4. The active air curtain apparatus of claim 3, wherein the drive gear includes:
    a first gear engaged with the first inner gear; and
    a second gear engaged with the second inner gear and the first gear.

5. The active air curtain apparatus of claim 1, wherein the duct includes a flap guide part formed at the discharge port side and configured to support and guide the flap.

6. The active air curtain apparatus of claim 5, wherein the flap guide part includes:
    a flap guide end having a shape that protrudes in a direction inclined to the direction of the air flow path and extends in a direction parallel to the longitudinal direction of the discharge port; and
    a flap guide aperture formed along the longitudinal direction of the flap guide end.

7. The active air curtain apparatus of claim 2, wherein the flap opens or closes the discharge port based on the rotation direction of the step motor.

8. An active air curtain system including a pair of active air curtain apparatuses of claim 1, wherein the pair of active air curtain apparatuses are mounted at the left side of the bumper and the right side of the bumper with respect to the front of the vehicle, respectively.

9. The active air curtain system of claim 8, wherein when the vehicle turns to the left, the discharge port of the active air curtain apparatus mounted to the left side of the bumper is closed, and when the vehicle turns to the right, the discharge port of the active air curtain apparatus mounted to the right side of the bumper is closed.

10. A method of operating a pair of active air curtain apparatuses, each which includes: a duct formed with a suction port, a discharge port, and an air flow path from the suction port to the discharge port and mounted to the inner surface of a bumper of a vehicle; and a flap having a plate shape operated by being supported and guided by the duct and configured to open and close the discharge port, the method comprising:
    determining by a controller, whether the vehicle turns; and
    operating, by the controller, the pair of active air curtain apparatuses based on whether the vehicle turns and to which direction the vehicle turns,
    wherein the pair of active air curtain apparatuses are mounted to the left side of the bumper and the right side of the bumper with respect to the front of the vehicle, respectively.

11. The method of claim 10, wherein when the vehicle turns to the left, the flap of the active air curtain apparatus mounted to the left side of the bumper is adjusted to operate in a direction in which the discharge port is closed.

12. The method of claim 11, further comprising:
    determining, by the controller, that the vehicle turns to the left when a steering angle of the vehicle is less than about −3° with respect to 0°.

13. The method of claim 10, wherein when the vehicle turns to the right, the flap of the active air curtain apparatus mounted to the right side of the bumper is adjusted to operate in a direction in which the discharge port is closed.

14. The method of claim 13, further comprising:
    determining, by the controller, that the vehicle turns to the right when a steering angle of the vehicle is greater than +3° with respect to 0°.

15. The method of claim 11, further comprising:
    comparing, by the controller, a vehicle speed with a reference vehicle speed prior to determining whether the vehicle turns.

16. The method of claim 15, further comprising:
    when the vehicle speed is greater than the reference vehicle speed, determining, by the controller, whether the vehicle turns; and
    in response to determining that the vehicle speed is less than the reference vehicle speed, maintaining the flap of the pair of active air curtain apparatuses in a state of opening the discharge port.

17. The method of claim 13, further comprising:
    in response to determining that the vehicle speed is greater than the reference vehicle speed, determining, by the controller, whether the vehicle turns; and
    in response to determining that the vehicle speed is less than the reference vehicle speed, maintaining the flap of the pair of active air curtain apparatuses in a state of opening the discharge port.

18. The method of claim 17, further comprising:
in response to determining that the vehicle speed is greater than the reference vehicle speed, determining, by the controller, whether the vehicle turns; and
in response to determining that the vehicle speed is less than the reference vehicle speed, maintaining the flap of the pair of active air curtain apparatuses in a state of opening the discharge port.

* * * * *